United States Patent
Shirato

(10) Patent No.: US 8,423,277 B2
(45) Date of Patent: Apr. 16, 2013

(54) VEHICLE RUNNING CONTROL METHOD FOR AVOIDING THAT A VEHICLE COLLIDES WITH AN OBSTACLE

(75) Inventor: Ryota Shirato, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1053 days.

(21) Appl. No.: 12/081,557

(22) Filed: Apr. 17, 2008

(65) Prior Publication Data

US 2008/0281521 A1   Nov. 13, 2008

(30) Foreign Application Priority Data

May 11, 2007   (JP) ................................ 2007-126568
Feb. 4, 2008   (JP) ................................ 2008-023763

(51) Int. Cl.
*G06F 17/10*   (2006.01)
(52) U.S. Cl.
USPC ............ 701/301; 340/435; 180/271; 180/272
(58) Field of Classification Search .................. 701/301; 340/435; 180/271, 272
See application file for complete search history.

(56) References Cited

U.S. PATENT DOCUMENTS

| | | | |
|---|---|---|---|
| 5,485,892 A | 1/1996 | Fujita | |
| 6,571,176 B1 * | 5/2003 | Shinmura et al. | 701/301 |
| 6,823,241 B2 | 11/2004 | Shirato et al. | |
| 6,926,374 B2 * | 8/2005 | Dudeck et al. | 303/191 |
| 7,283,907 B2 * | 10/2007 | Fujiwara et al. | 701/301 |
| 7,966,127 B2 | 6/2011 | Ono et al. | |
| 2001/0003810 A1 | 6/2001 | Shinmura et al. | |
| 2004/0193351 A1 * | 9/2004 | Takahashi et al. | 701/70 |
| 2004/0193374 A1 * | 9/2004 | Hac et al. | 701/301 |
| 2007/0010945 A1 * | 1/2007 | Shoda et al. | 701/301 |
| 2007/0299610 A1 | 12/2007 | Ewerhart et al. | |
| 2009/0024357 A1 | 1/2009 | Aso et al. | |

FOREIGN PATENT DOCUMENTS

| | | |
|---|---|---|
| DE | 10 2005 023 832 A1 | 11/2006 |
| EP | 1 717 778 A1 | 11/2006 |
| EP | 1 990 250 A2 | 11/2008 |
| JP | 2000-207693 A | 7/2000 |
| JP | 3197307 B2 | 6/2001 |
| JP | 3521860 B2 | 2/2004 |
| JP | 2006-298294 A | 11/2006 |
| WO | WO 2005/080133 A1 | 9/2005 |
| WO | WO 2005/082681 A1 | 9/2005 |
| WO | WO 2006/070865 A1 | 7/2006 |
| WO | WO 2007/102367 A1 | 9/2007 |

\* cited by examiner

*Primary Examiner* — Kira Nguyen
(74) *Attorney, Agent, or Firm* — Foley & Lardner LLP

(57) ABSTRACT

A vehicle controller selects a collision avoidance route corresponding to steering of a vehicle by a driver, to control the vehicle so that the vehicle runs based on the selected collision avoidance route. Accordingly, it can be prevented that a vehicle operation being performed by the driver is disturbed, in other words, a reaction of the driver is disturbed by collision avoidance control and the driver feels discomfort with respect to the collision avoidance control.

22 Claims, 9 Drawing Sheets

VEHICLE RUNNING CONTROL METHOD FOR AVOIDING THAT A VEHICLE COLLIDES WITH AN OBSTACLE

BACKGROUND OF THE INVENTION

1. Field of the Invention

The present invention relates to a vehicle running control method and a vehicle running control apparatus for avoiding that a vehicle collides with an obstacle.

2. Description of the Related Art

Conventionally, as disclosed in Japanese Patent No. 3197307, a vehicle running control apparatus has been known, which selects and executes collision avoidance control from collision avoidance control by steering control, collision avoidance control by speed control, and collision avoidance control by using both controls, according to a running condition of a vehicle and a driver's operating condition. According to such a running control apparatus, it can be avoided that the vehicle collides with an obstacle by the collision avoidance control according to the running condition of the vehicle and the driver's operating condition.

The running control apparatus disclosed in Japanese Patent No. 3197307 has a configuration in which control is interposed in vehicle operation, which is not performed by the driver, such that when the driver does not perform a steering operation, collision avoidance control is performed by steering control; when the driver does not perform a braking operation, collision avoidance control is performed by speed control; and when the driver does not perform the steering operation and the braking operation, collision avoidance control is performed by the steering control and the speed control. Therefore, according to the running control apparatus disclosed in Japanese Patent No. 3197307, when the collision avoidance control is different from the driver's operation intention, the vehicle operation to be performed by the driver is disturbed by the collision avoidance control, and hence, the driver may feel discomfort with respect to the collision avoidance control.

The present invention has been achieved in order to solve the above problems. It is an object of the present invention to provide a vehicle running control method and a vehicle running control apparatus that can prevent the driver from feeling discomfort with respect to the collision avoidance control by performing the collision avoidance control without disturbing the driver's vehicle operation as much as possible.

SUMMARY OF THE INVENTION

In the vehicle running control method and the vehicle running control apparatus according to the present invention, a plurality of collision avoidance routes for avoiding that the own vehicle collides with an obstacle is generated based on an operating state of the own vehicle, and a collision avoidance route corresponding to the driver's vehicle operation is selected from the generated collision avoidance routes, thereby to perform running control based on the selected collision avoidance route.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION OF THE PREFERRED EMBODIMENTS

A vehicle running control apparatus and operations thereof according to first and second embodiments of the present invention will be explained below with reference to the accompanying drawings.

First Embodiment

A configuration and an operation of the vehicle running control apparatus (hereinafter, "control apparatus") as the first embodiment of the present invention is explained with reference to FIGS. 1 to 4.

[Configuration of Control Apparatus]

Figure 1:
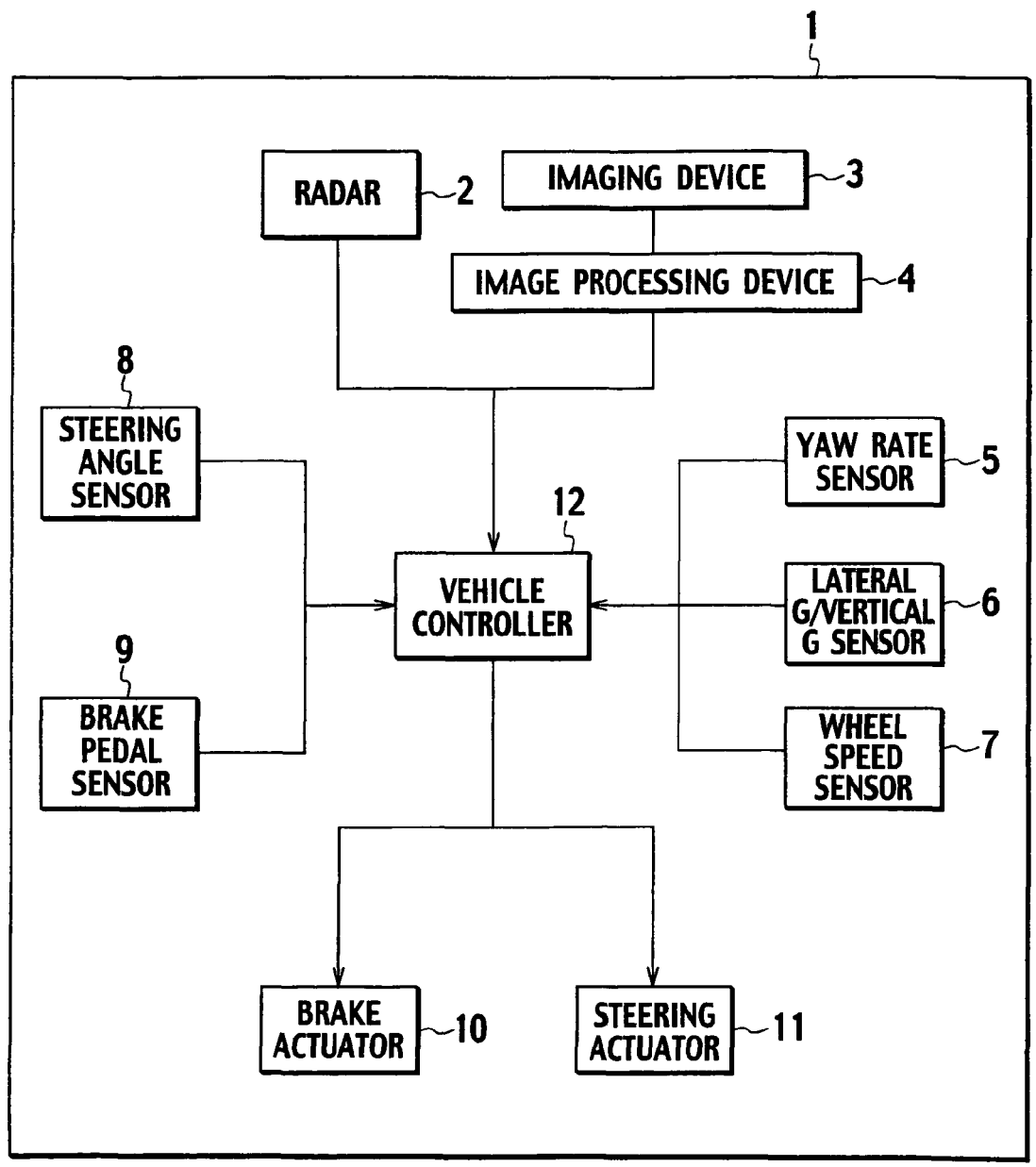
FIG. 1 is a block diagram showing a configuration of a vehicle running control apparatus according to a first embodiment of the present invention.
Figure 2:
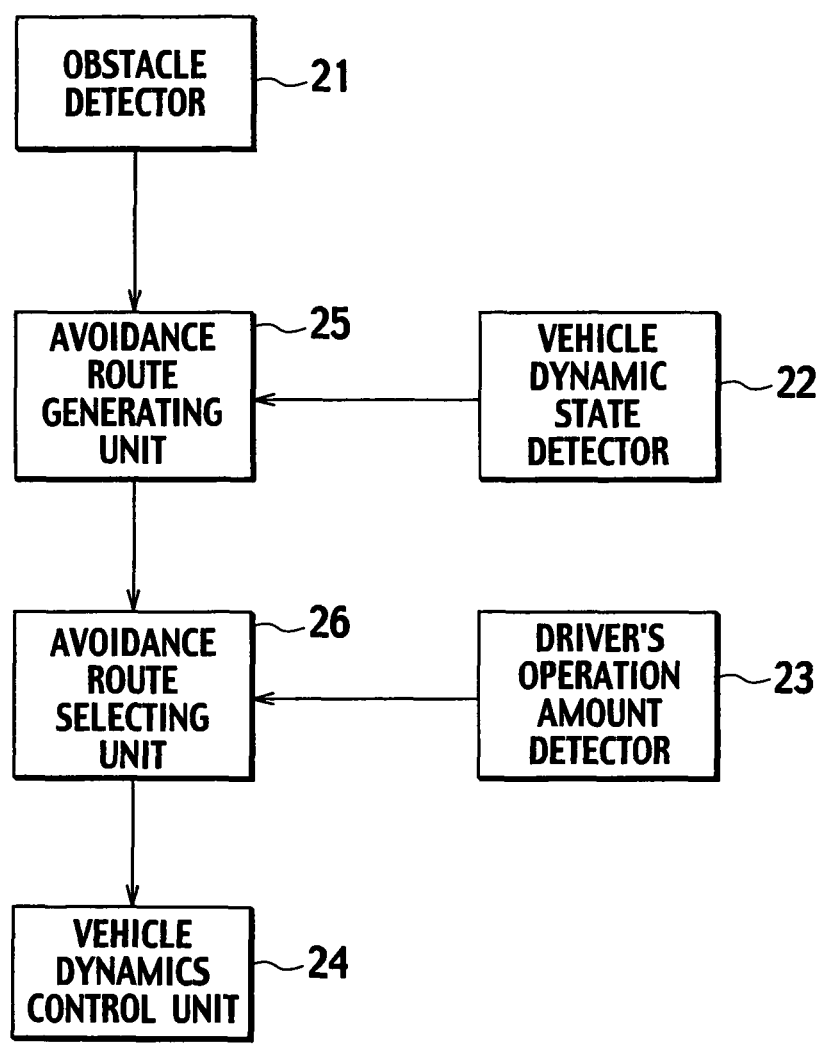
FIG. 2 is a functional block diagram of the vehicle running control apparatus shown in FIG. 1.

The control apparatus according to the first embodiment is mounted on a vehicle 1, as shown in FIG. 1, and includes a radar 2, an imaging device 3, an image processing device 4, a yaw rate sensor 5, a lateral G/vertical G sensor 6, a wheel speed sensor 7, a steering angle sensor 8, a brake pedal sensor 9, a brake actuator 10, a steering actuator 11, and a vehicle controller 12 as main components.

The radar 2 irradiates laser beams forward of the vehicle, receives reflected light from an object irradiated with the laser beams by a received ray system, and detects time difference between a point in time when the laser beams has been emitted and a point in time when the reflected light has been received, thereby to measure the presence of an obstacle, a distance between the vehicle 1 and the obstacle, and a position of the obstacle. The radar 2 inputs a measurement result to the vehicle controller 12.

The imaging device 3 picks up an image in front of the vehicle 1 and outputs the image to the image processing device 4. The image processing device 4 processes the image captured by the imaging device 3 to detect running environment information of the vehicle 1 such as peripheral vehicles and road environment, and inputs a detection result to the vehicle controller 12. The radar 2, the imaging device 3, and the image processing device 4 function as an obstacle detector 21 according to the present invention shown in FIG. 2.

The yaw rate sensor 5 detects a yaw rate occurring in the vehicle 1 and inputs a detection value to the vehicle controller 12. The lateral G/vertical G sensor 6 detects a lateral acceleration G (lateral G) and a vertical acceleration (vertical G) occurring in the vehicle 1 and inputs respective detection values to the vehicle controller 12. The wheel speed sensor 7 detects a rotation speed (wheel speed) of respective wheels of the vehicle 1, and inputs detection values thereof to the vehicle controller 12. The yaw rate sensor 5, the lateral G/vertical G sensor 6, and the wheel speed sensor 7 function as a vehicle dynamic state detector 22 according to the present invention shown in FIG. 2.

The steering angle sensor 8 detects a steering angle of a steering of the vehicle 1 and inputs a detection value to the vehicle controller 12. The brake pedal sensor 9 detects a depressed amount of a brake pedal of the vehicle 1 and inputs a detection value to the vehicle controller 12. The steering angle sensor 8 and the brake pedal sensor 9 function as a driver's operation amount detector 23 according to the present invention shown in FIG. 2.

The brake actuator 10 controls a damping fluid pressure supplied to a wheel cylinder of the vehicle 1 to perform a braking operation of the vehicle 1 by generating a braking force in the vehicle 1. The steering actuator 11 controls the steering angle of the steering of the vehicle 1 to perform a steering operation of the vehicle 1 by generating a lateral force in the vehicle 1. The brake actuator 10 and the steering actuator 11 function as a vehicle dynamics control unit 24 according to the present invention shown in FIG. 2.

The vehicle controller 12 includes a microcomputer, and controls the operation of the brake actuator 10 and the steering actuator 11 based on the information input from the radar 2, the image processing device 4, the yaw rate sensor 5, the lateral G/vertical G sensor 6, the wheel speed sensor 7, the steering angle sensor 8, and the brake pedal sensor 9. The vehicle controller 12 functions as an avoidance route selecting unit 26 and an avoidance-route selecting/correcting unit 27 according to the present invention shown in FIG. 2, by executing a control program by a CPU included therein.

[Running Control Process]

In the control apparatus having such a configuration, the vehicle controller 12 executes the running control process described below to avoid that the vehicle 1 collides with the obstacle. An operation of the vehicle controller 12 at the time of executing the running control process is explained with reference to a flowchart shown in FIG. 3.

Figure 3:
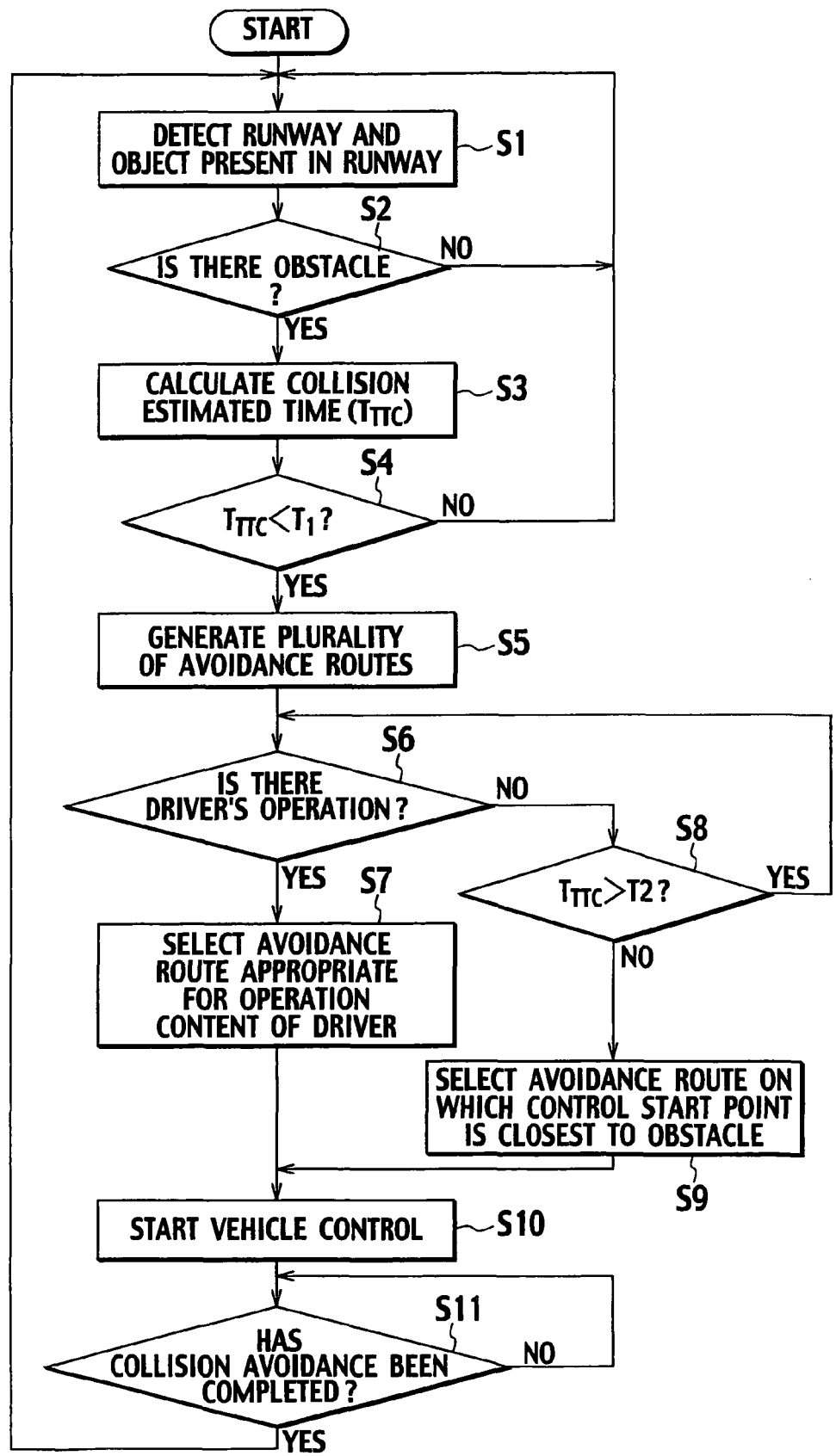
FIG. 3 is a flowchart showing a flow of a running control process according to the first embodiment.

The flow of FIG. 3 starts at a timing where an ignition switch of the vehicle 1 is changed from OFF to ON, and the running control process proceeds to step S1.

In the process at step S1, the vehicle controller 12 detects an area in which the vehicle 1 can run (hereinafter, "runway") and an object present in the runway by using the input information from the radar 2 and the image processing device 34. The detection method of the runway has been already known at the time of filing the present invention, and therefore detailed explanations thereof will be omitted. For example, please refer to Japanese Patent No. 3521860, for the details of the detection method of the runway. Consequently, the process at step S1 is complete and the running control process proceeds to step S2.

In the process at step S2, the vehicle controller 12 uses the processing result at step S1 to determine whether an object having possibility to collide with the vehicle 1 (hereinafter, "obstacle") is present in the runway. Because the detection method of the obstacle has been already known at the time of filing the present invention, detailed explanations thereof will be omitted. For example, please refer to Japanese Patent Application Laid-Open No. 2000-207693, for the details of the detection method of the obstacle. As a result of determination, when it is determined that the obstacle is not present in the runway, the vehicle controller 12 returns the running control process to the process at step S1. On the other hand, when it is determined that the obstacle is present in the runway, the vehicle controller 12 advances the running control process to step S3.

In the process at step S3, the vehicle controller 12 uses information of the distance between the obstacle and the vehicle 1 and a relative velocity between the obstacle and the vehicle 1 to calculate the time until the vehicle 1 collides with the obstacle confirmed by the process at step S2 as collision estimated time $T_{TTC}$. The distance between the obstacle and the vehicle 1 can be calculated by the input information from the radar 2, and the relative velocity between the obstacle and the vehicle 1 can be calculated by, for example, differentiating the calculated distance. Accordingly, the process at step S3 is complete and the running control process proceeds to step S4.

In the process at step S4, the vehicle controller 12 determines whether the collision estimated time $T_{TTC}$ calculated by the process at step S3 is within preset time $T_1$. As a result of the determination, when the collision estimated time $T_{TTC}$ is not within the predetermined time $T_1$, the vehicle controller 12 returns the running control process to the process at step S1. On the other hand, when the collision estimated time $T_{TTC}$ is within the predetermined time $T_1$, the vehicle controller 12 advances the running control process to step S5.

Generally, when the collision estimated time $T_{TTC}$ is not within the predetermined time $T_1$, in other words, when the time until the vehicle 1 collides with the obstacle is comparatively long, the risk of collision with the obstacle can be reduced due to the vehicle operation by the driver, and it is high likely that execution of the collision avoidance control will not be needed. Therefore, according to the determination process at step S4, it is prevented that the process described later is executed although the collision avoidance control need not be executed, thereby enabling to reduce a processing load of the vehicle controller 12.

In the process at step S5, the vehicle controller 12 uses the information of the runway detected by the process at step S1 and the input information from the yaw rate sensor 5, the lateral G/vertical G sensor 6, and the wheel speed sensor 7, to generate (calculate) a plurality of running routes of the vehicle 1 for avoiding the collision with the obstacle as the collision avoidance route, taking the runway and the motion state of the vehicle 1 into consideration.

Figure 4:
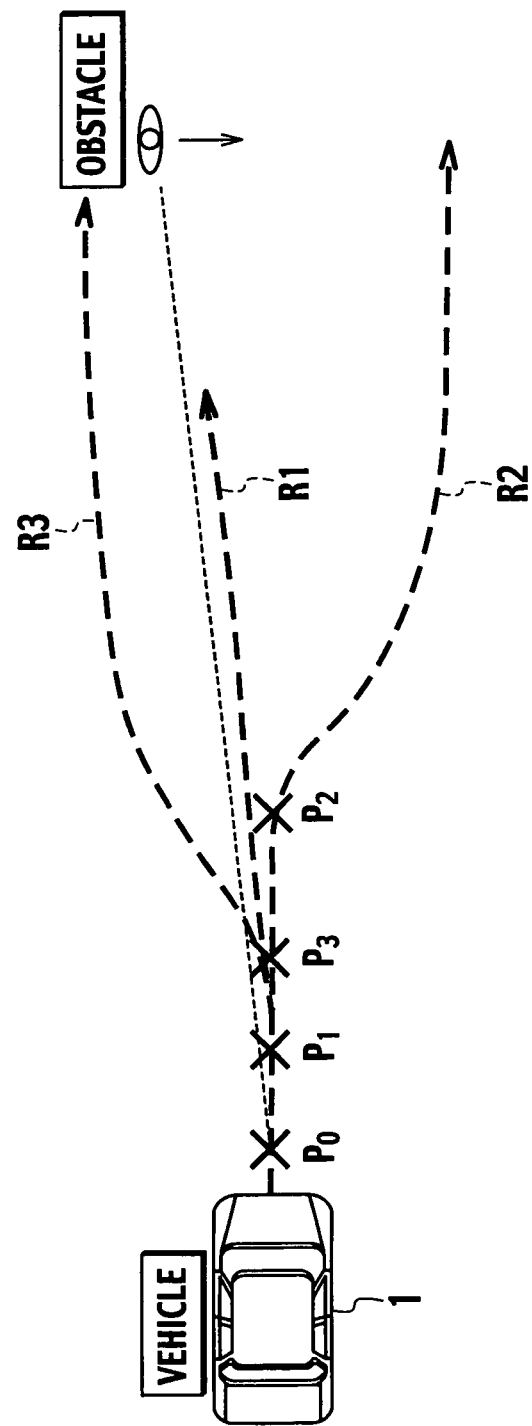
FIG. 4 shows one example of a collision avoidance route generated in the running control process shown in FIG. 3.

In the first embodiment, as shown in FIG. 4, the vehicle controller 12 generates collision avoidance routes R1, R2, and R3 appropriate for respective conditions when the driver depresses the brake pedal of the vehicle 1 to start the braking operation, when the driver starts the steering operation to the right, and when the driver starts the steering operation to the left. At this time, the vehicle controller 12 does not generate a collision avoidance route deviated from the runway range or a collision avoidance route that cannot avoid a collision with the obstacle by the driver's operation of the vehicle 1.

Specifically, when collision avoidance route R1 appropriate for when the driver starts the braking operation is to be generated, the vehicle controller 12 takes into consideration the input information from the yaw rate sensor 5, the lateral G/vertical G sensor 6, and the wheel speed sensor 7 and tire characteristics of the vehicle 1 at beginning, to set a deceleration of the vehicle 1 for avoiding the collision with the obstacle, and determines whether the vehicle 1 can avoid the collision with the obstacle by the set deceleration.

When having determining that the vehicle 1 can avoid the collision with the obstacle, the vehicle controller 12 calculates a collision avoidance route by the vehicle control only by the deceleration within the runway range. On the contrary, when having determining that the vehicle 1 cannot avoid the collision with the obstacle, the vehicle controller 12 calculates a collision avoidance route for avoiding the collision with the obstacle by generating a minimum lateral force required within the runway range. However, an upper limit is set to the lateral force, taking the tire characteristics of the vehicle 1 into consideration, and when the lateral force exceeding the upper limit is required, the vehicle controller 12 does not calculate the collision avoidance route.

Likewise, when collision avoidance routes R2 and R3 appropriate when the driver starts the steering operation (steering operation to the right and steering operation to the left) are to be generated, the vehicle controller 12 takes into consideration the input information from the yaw rate sensor 5, the lateral G/vertical G sensor 6, and the wheel speed sensor 7 and the tire characteristics of the vehicle 1 at beginning, to set a lateral acceleration of the vehicle 1 for avoiding the collision with the obstacle, and determines whether the vehicle 1 can avoid the collision with the obstacle by the set lateral acceleration.

When having determined that the vehicle 1 can avoid the collision with the obstacle, the vehicle controller 12 calculates the collision avoidance route by the vehicle control only by the lateral acceleration within the runway range. On the contrary, when having determined that the vehicle 1 cannot avoid the collision with the obstacle, the vehicle controller 12 calculates a collision avoidance route for avoiding the collision with the obstacle by generating a minimum braking force required within the runway range. However, an upper limit is set to the braking force by taking the tire characteristics of the vehicle 1 into consideration, and when the braking force exceeding the upper limit is required, the vehicle controller 12 does not calculate the collision avoidance route. Further, even when the collision avoidance route by the vehicle control only by the lateral acceleration has been calculated, the vehicle controller 12 can also calculate the collision avoidance route, taking into consideration also the braking force without exceeding the upper limit, since it is generally safer to pass by the obstacle by decelerating the vehicle speed as much as possible when the vehicle runs near the obstacle. Accordingly, the process at step S5 is complete and the running control process proceeds to step S6.

In the process at step S6, the vehicle controller 12 refers to the input information from the steering angle sensor 8 and the brake pedal sensor 9 to determine whether at least one of the steering operation and the braking operation by the driver has been detected. As a result of determination, when any of the steering operation and the braking operation has not been detected, the vehicle controller 12 advances the running control process to step S8. On the other hand, when at least one of the steering operation and the braking operation has been detected, the vehicle controller 12 advances the running control process to step S7. Any detection method of the steering operation can be used, so long as, for example, it can detect to which direction, left or right, the steering is performed from the steering angle at the time of calculating the collision avoidance route at step S5. Further, a method for determining not only the steering direction but also whether there is a change in the steering angle from the steering angle at the time of calculating the collision avoidance route larger than a predetermined threshold can be used. Furthermore, it can be a method for determining whether steering angle velocity or steering angle acceleration is higher than a predetermined threshold, instead of making determination on the steering angle change.

In the process at step S7, the vehicle controller 12 selects the collision avoidance route appropriate for the operation content of the driver detected by the process at step S6 from the plurality of collision avoidance routes generated by the process at step S5. Specifically, when the braking operation has been detected, the vehicle controller 12 selects collision avoidance route R1 appropriate for when the driver has started the braking operation; when the steering operation to the right has been detected, the vehicle controller 12 selects collision avoidance route R2 appropriate for when the driver has started steering to the right; and when the steering operation to the left has been detected, the vehicle controller 12 selects collision avoidance route R3 appropriate for when the driver has started steering to the left. In this process, the vehicle controller 12 basically selects the collision avoidance route appropriate for the operation content of the driver. However, according to the timing where the driver's operation has been detected, the content of the collision avoidance control is changed as shown in Table 1 below.

TABLE 1

|  | RUNNING ROUTE OF VEHICLE OVERLAPS ON COLLISION AVOIDANCE ROUTE | RUNNING ROUTE OF VEHICLE DOSE NOT OVERLAP ON COLLISION AVOIDANCE ROUTE |
| --- | --- | --- |
| DRIVER STARTED OPERATION BEFORE CONTROL START POINT | START CONTROL AFTER RUNNING ROUTE OVERLAPS ON COLLISION AVOIDANCE ROUTE | DO NOT START COLLISION AVOIDANCE CONTROL |
| DRIVER STARTED OPERATION AFTER CONTROL START POINT | START CONTROL AFTER RUNNING ROUTE OVERLAPS ON COLLISION AVOIDANCE ROUTE | SELECT ANOTHER COLLISION AVOIDANCE ROUTE |
| NO DRIVER'S OPERATION | SELECT COLLISION AVOIDANCE ROUTE ON WHICH CONTROL START POINT IS CLOSEST TO OBSTACLE | |

To specifically explain the above process with reference to Table 1 and FIG. 4, for example, when the driver performs the steering operation to the left, the vehicle controller 12 selects collision avoidance route R3 appropriate for when the driver has started the steering operation. However, in a case that the control start point $P_3$ on the collision avoidance route R3 is positioned on the obstacle side than the point where the driver has started the steering operation or at the same point, if the running route of the vehicle 1 according to the driver's steering operation does not overlap on the collision avoidance route R3, the vehicle controller 12 completes the vehicle control process. Further, in a case that the control start point $P_3$ on the collision avoidance route R3 is positioned closer to the obstacle than the point where the driver has started the steering operation or at the same point, if the running route of the vehicle 1 according to the driver's steering operation overlaps on the collision avoidance route R3, the vehicle controller 12 executes the collision avoidance control from the point where the running route of the vehicle 1 according to the driver's steering operation overlaps on the collision avoidance route R3.

On the other hand, in a case that the control start point $P_3$ on the collision avoidance route R3 is positioned farther from the obstacle than the point where the driver has started the steering operation, if the running route of the vehicle 1 according to the driver's steering operation does not overlap on the collision avoidance route R3, the vehicle controller 12 selects a collision avoidance route, on which the control start point is closest to the point where the driver has started the steering operation. Further, in the case that the control start point $P_3$ on the collision avoidance route R3 is positioned farther from the obstacle than the point where the driver has started the steering operation, if the running route of the vehicle 1 according to the driver's steering operation overlaps on the collision avoidance route R3, the vehicle controller 12 executes the collision avoidance control from the point where the running route of the vehicle 1 according to the driver's steering operation overlaps on the collision avoidance route R3. Consequently, the process at step S7 is complete, and the vehicle control process proceeds to step S10.

The selection method of the collision avoidance route can be selected simply from only the steering operation direction. Further, when the control start point $P_3$ on the collision avoidance route R3 is positioned farther from the obstacle than the point where the driver has started the steering operation, and when the running route of the vehicle 1 overlaps on the collision avoidance route R3, the collision avoidance control can be executed so as to follow the collision avoidance route R3. In this case, an operation amount of the driver insufficient for the collision avoidance route R3 is compensated by the collision avoidance control.

In the process at step S8, the vehicle controller 12 determines whether the collision estimated time $T_{TTC}$ calculated by the process at step S3 is longer than collision estimated time $T_2$ when the vehicle has reached a control start point on the collision avoidance route, which is closest to the obstacle. As a result of determination, if the collision estimated time $T_{TTC}$ is longer than the collision estimated time $T_2$, the vehicle controller 12 returns the vehicle control process to step S6. On the other hand, if the collision estimated time $T_{TTC}$ is not longer than the collision estimated time $T_2$, the vehicle controller 12 advances the vehicle control process to step S9.

In the process at step S9, the vehicle controller 12 determines that the point where the driver has started the operation is closer to the obstacle than the control start point on any collision avoidance route, and the driver has not started any operation even when the vehicle has reached the control start point on any collision avoidance route, and selects the collision avoidance route, on which the control start point is closest to the obstacle. Accordingly, the process at step S9 is complete, and the vehicle control process proceeds to step S10.

In the process at step S10, the vehicle controller 12 controls the brake actuator 10 and the steering actuator 11 so that the vehicle 1 runs along the collision avoidance route selected in the process at step S7 or S9. Accordingly, the process at step S10 is complete, and the vehicle control process proceeds to step S11.

In the process at step S11, the vehicle controller 12 determines whether the possibility of the collision between the vehicle 1 and the obstacle has disappeared due to the vehicle control or the driver's vehicle operation. As a result of determination, if there is still the possibility of collision, the vehicle controller 12 maintains the current control state, and returns the vehicle control process to step S1 at the timing where there is no possibility of collision, to execute the vehicle control process with respect to other obstacles.

In the process at step S1, an object present on the runway is detected. However, for example, an object present within a predetermined region in front of the own vehicle can be detected, regardless of being on the runway or not.

At step S7, it is determined whether the estimated route of the vehicle overlaps on the selected collision avoidance route. However, the steering actuator 11 (and the brake actuator 10) can be simply controlled to follow the selected collision avoidance route, with the above determination being omitted.

Further, at step S5, only collision avoidance routes R2 and R3 can be generated without generating collision avoidance route R1. At this time, when the driver has started the braking operation, a collision avoidance route on which the control start point is closest to the braking operation start point can be selected. Accordingly, the calculation process load of the vehicle controller 12 can be further reduced.

The conventional collision avoidance control technique has a configuration in which the control is interposed in the vehicle operation, which is not performed by the driver. Therefore, when the collision avoidance control is different from the driver's operation intention, the vehicle operation to be performed by the driver by the collision avoidance control, in other words, the vehicle operation intended by the driver may be disturbed, and the driver may feel discomfort with respect to the collision avoidance control. On the other hand, in the vehicle control process according to the first embodiment, as described above, the vehicle controller 12 selects a collision avoidance route corresponding to steering of the vehicle 1 or depression of the brake pedal by the driver, and controls the vehicle 1 so as to run based on the selected collision avoidance route. Accordingly, it can be prevented that the driver feels discomfort with respect to the collision avoidance control.

Further, in the conventional collision avoidance control technique, the configuration is such that the control is not interposed in the vehicle operation, which is being performed by the driver. Therefore, when the vehicle operation being performed by the driver is not appropriate for avoiding a collision with the obstacle, there is a possibility that the collision between the vehicle 1 and the obstacle cannot be avoided. On the other hand, in the vehicle control process according to the first embodiment, as described above, when the collision with the obstacle can be avoided by the vehicle operation of the driver, the vehicle controller 12 does not execute the collision avoidance control and leaves the control to the driver's vehicle operation. When the operation amount of the driver is insufficient for avoiding the collision with the obstacle, the vehicle controller 12 executes the collision avoidance control so as to increase the operation amount supplementary. Accordingly, if the vehicle operation being performed by the driver is not appropriate for avoiding the collision between the vehicle 1 and the obstacle, collision of the vehicle 1 with the obstacle can be avoided.

In the vehicle control process according to the first embodiment, as shown in FIG. 4, the vehicle controller 12 generates at least three types of collision avoidance routes, that is, collision avoidance route R1 for avoiding the collision with the obstacle by the braking operation, collision avoidance route R2 for avoiding the collision with the obstacle by the steering operation to the right, and collision avoidance route R3 for avoiding the collision with the obstacle by the steering operation to the left. Therefore, a collision avoidance route appropriate for the driver's vehicle operation for avoiding the collision with the obstacle can be generated.

Further, in the vehicle control process according to the first embodiment, the vehicle controller 12 selects the collision avoidance route R1 for avoiding the collision with the obstacle by the braking operation, when the braking operation by the driver is detected. When the steering operation to the right by the driver is detected, the vehicle controller 12 selects the collision avoidance route R2 for avoiding the collision with the obstacle by the steering operation to the right; and when the steering operation to the left by the driver is detected, the vehicle controller 12 selects the collision avoidance route R3 for avoiding the collision with the obstacle by the steering operation to the left. When a collision avoidance route corresponding to the driver's vehicle operation has not been generated, the vehicle controller 12 selects a collision avoidance route, on which a point for starting the collision avoidance control is closest to the obstacle as seen from a point where the driver's vehicle operation has been detected. Accordingly, the collision avoidance control can be executed while minimizing discomfort of the driver.

Further, in the vehicle control process according to the first embodiment, when a plurality of collision-avoidance-control start points on the collision avoidance routes are positioned on the obstacle side than the point where the driver's vehicle operation has been detected or at the same point, the vehicle controller 12 determines whether the running route of the vehicle 1 according to the driver's vehicle operation overlaps on any one of the collision avoidance routes. When the running route of the vehicle 1 according to the driver's vehicle operation overlaps on any one of the collision avoidance routes, the vehicle controller 12 selects a collision avoidance route overlapping on the running route of the vehicle 1 according to the driver's vehicle operation, and executes the collision avoidance control at a timing when the running route of the vehicle 1 according to the driver's vehicle operation overlaps on the collision avoidance route. When the running route of the vehicle 1 according to the driver's vehicle operation does not overlap on any of the collision avoidance routes, the vehicle controller 12 does not execute the collision avoidance control.

On the other hand, when the collision-avoidance-control start point on the collision avoidance routes are positioned farther from the obstacle side than the point where the driver's vehicle operation has been detected, the vehicle controller 12 determines whether the running route of the vehicle 1 according to the driver's vehicle operation overlaps on any one of the collision avoidance routes. When the running route of the vehicle 1 according to the driver's vehicle operation overlaps on any one of the collision avoidance routes, the vehicle controller 12 selects a collision avoidance route overlapping on the running route of the vehicle 1 according to the driver's vehicle operation, and executes the collision avoidance control at the timing when the running route of the vehicle 1 according to the driver's vehicle operation overlaps on the collision avoidance route. When the running route of the vehicle 1 according to the driver's vehicle operation does not overlap on any one of the collision avoidance routes, the vehicle controller 12 selects a collision avoidance route on which the collision-avoidance-control start point is farthest from the vehicle 1.

According to such a process, when the collision with the obstacle can be avoided by the driver's vehicle operation, the vehicle controller 12 does not execute the collision avoidance control and leaves the control to the driver's vehicle operation. When the operation amount of the driver is insufficient for avoiding the collision with the obstacle, the vehicle controller 12 can execute the collision avoidance control naturally, without disturbing the driver's vehicle operation.

[Modification]

Figure 5:
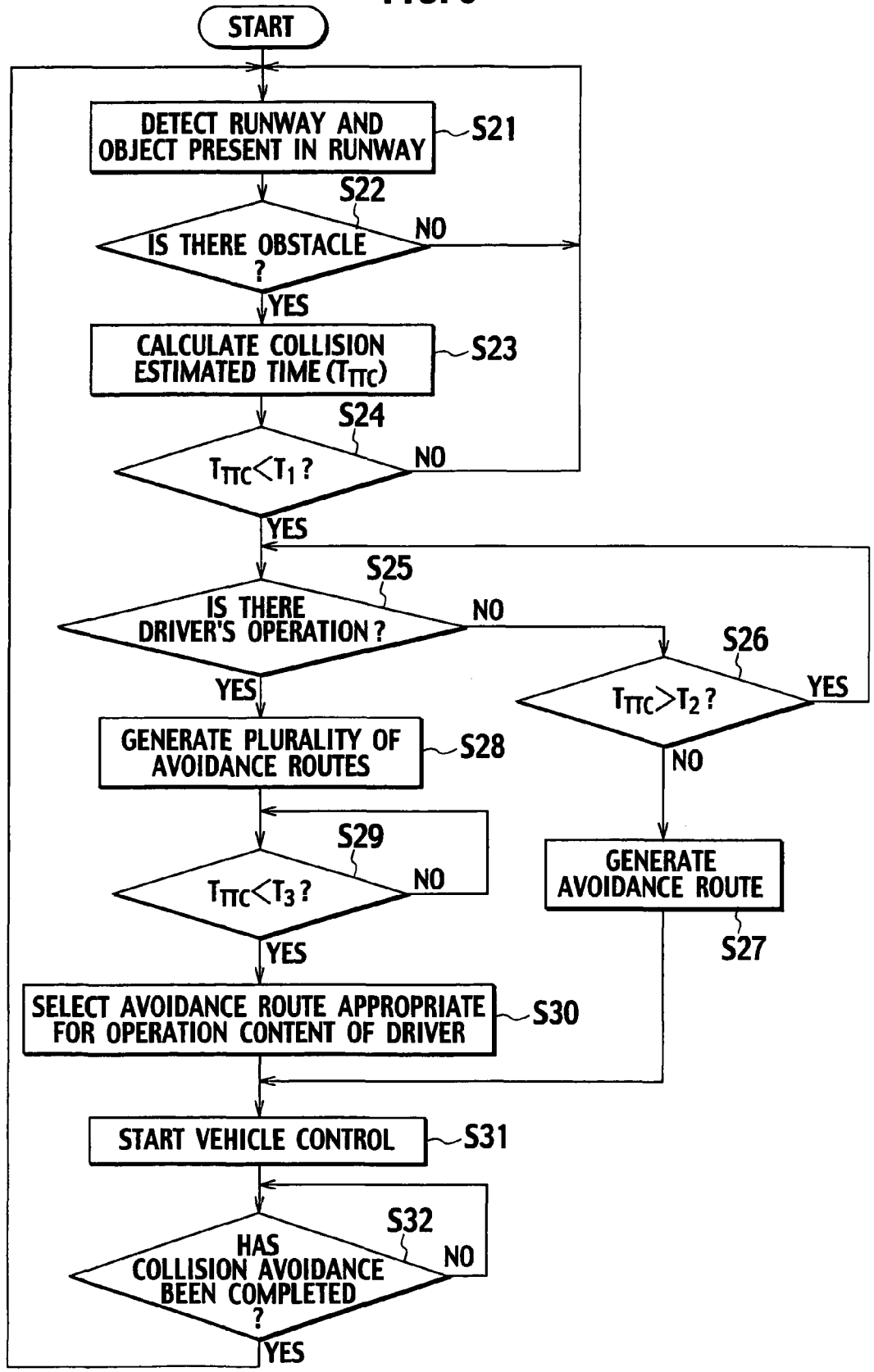
FIG. 5 is a flowchart showing a flow of a modified example of the running control process shown in FIG. 3.

A modification of the running control process according to the first embodiment is explained with reference to a flowchart shown in FIG. 5. The flow of FIG. 5 starts at a timing where the ignition switch of the vehicle 1 is changed from OFF to ON, and the running control process proceeds to step S21. Because the process from steps S21 to S24 is the same as that from steps S1 to S4 in the flowchart shown in FIG. 3, explanations thereof will be omitted, and only processes from step S25 are explained.

In the process at step S25, the vehicle controller 12 refers to the input information from the steering angle sensor 8 and the brake pedal sensor 9 to determine whether at least one of the steering operation and the braking operation by the driver has been detected. As a result of determination, when both the steering operation and the braking operation have not been detected, the vehicle controller 12 advances the running control process to step S26. On the other hands, when at least one of the steering operation and the braking operation has been detected, the vehicle controller 12 advances the running control to step S28.

In the process at step S26, the vehicle controller 12 determines whether the collision estimated time $T_{TTC}$ calculated by the process at step S23 is longer than the collision estimated time $T_2$ when the vehicle has reached the control starting point on the collision avoidance route, which is closest to the obstacle. As a result of determination, if the collision estimated time $T_{TTC}$ is longer than the collision estimated time $T_2$, the vehicle controller 12 returns the vehicle control process to step S25. On the other hand, if the collision estimated time $T_{TTC}$ is not longer than the collision estimated time $T_2$, the vehicle controller 12 advances the vehicle control process to step S27.

In the process at step S27, the vehicle controller 12 automatically generates a path most appropriate for avoiding the obstacle. The path is set according to a route drawn along the traveling direction of the obstacle, for example, by setting the minimum relative distance from the obstacle to 1 meter. Consequently, the process at step S27 is complete, and the vehicle control process proceeds to step S31.

In the process at step S28, the vehicle controller 12 uses the information of the runway detected by the process at step S21 and the input information from the yaw rate sensor 5, the lateral G/vertical G sensor 6, and the wheel speed sensor 7, to generate a plurality of running routes of the vehicle 1 for avoiding the collision between the vehicle 1 and the obstacle appropriate for the driver's vehicle operation detected by the process at step S25, as the collision avoidance route. Specifically, when the steering operation to the right by the driver has been detected in the process at step S25, the vehicle controller 12 generates a collision avoidance route appropriate for when the driver has performed the steering operation to the right, and a collision avoidance route appropriate for when the driver has performed the steering operation to the left and the braking operation. In this case, the vehicle controller 12 can generate a plurality of collision avoidance routes corresponding to the steering angle speed. Consequently, the process at step S28 is complete, and the vehicle control process proceeds to step S29.

In the process at step S29, the vehicle controller 12 determines whether the collision estimated time $T_{TTC}$ calculated by the process at step S23 is within predetermined time $T_3$. The vehicle controller 12 advances the vehicle control process to step S30 at a timing where the collision estimated time $T_{TTC}$ becomes within the predetermined time $T_3$.

In the process at step S30, the vehicle controller 12 selects a collision avoidance route corresponding to the vehicle operation performed by the driver since generation of the collision avoidance routes until the collision estimated time $T_{TTC}$ becomes equal to or less than a predetermined value $T_3$, from the collision avoidance routes generated by the process at step S28. Specifically, when the vehicle operation performed by the driver since generation of the collision avoidance routes until the collision estimated time $T_{TTC}$ becomes equal to or less than the predetermined value $T_3$ is only the steering operation to the right, the vehicle controller 12 selects the collision avoidance route appropriate for when the driver has performed the steering operation to the right. When the collision avoidance routes are generated according to the steering angle speed, the vehicle controller 12 calculates the steering angle speed for the period since generation of the collision avoidance routes until the collision estimated time becomes equal to or less than the predetermined value $T_3$, to select a collision avoidance route with the steering angle speed closest to the calculated steering angle speed. Consequently, the process at step S30 is complete, and the vehicle control process proceeds to step S31.

In the process at step S31, the vehicle controller 12 controls the brake actuator 10 and the steering actuator 11 so that the vehicle 1 runs along the collision avoidance route selected by the process at steps S27 and S30. Consequently, the process at step S31 is complete, and the vehicle control process proceeds to step S32.

In the process at step S32, the vehicle controller 12 determines whether the possibility of the collision between the vehicle 1 and the obstacle has disappeared due to the vehicle control or the driver's vehicle operation. As a result of determination, if there is still the possibility of collision, the vehicle controller 12 maintains the current control state, and returns the vehicle control process to step S21 at the timing where there is no possibility of collision, to execute the vehicle control process with respect to other obstacles.

As is obvious from the above explanations, according to the modification, after the collision avoidance routes have been generated, when the collision estimated time becomes equal to or less than the predetermined value $T_3$ (step S29), the avoidance route corresponding to the operation performed by the driver in the period since generation of the routes until $T_2$ is selected (step S30). Therefore, in addition to the effect of the first embodiment, for example, when the driver's operation is only steering to the right, the route only by the steering operation to the right is selected, thereby enabling to quickly select the route following the steering operation of the driver.

Selection of the collision avoidance routes can be performed from those other than the collision avoidance routes based on the vehicle operation performed by the driver in the period since generation of the collision avoidance routes until the collision estimated time becomes equal to or less than the predetermined value $T_3$. For example, during a predetermined period after the operation by the driver has started, the operation state can be detected to select the collision avoidance route based on the operation state.

Second Embodiment

Operations of a control apparatus according to the second embodiment of the present invention will be explained with reference to FIGS. 6 to 9.

[Configuration of Control Apparatus]

Figure 6:
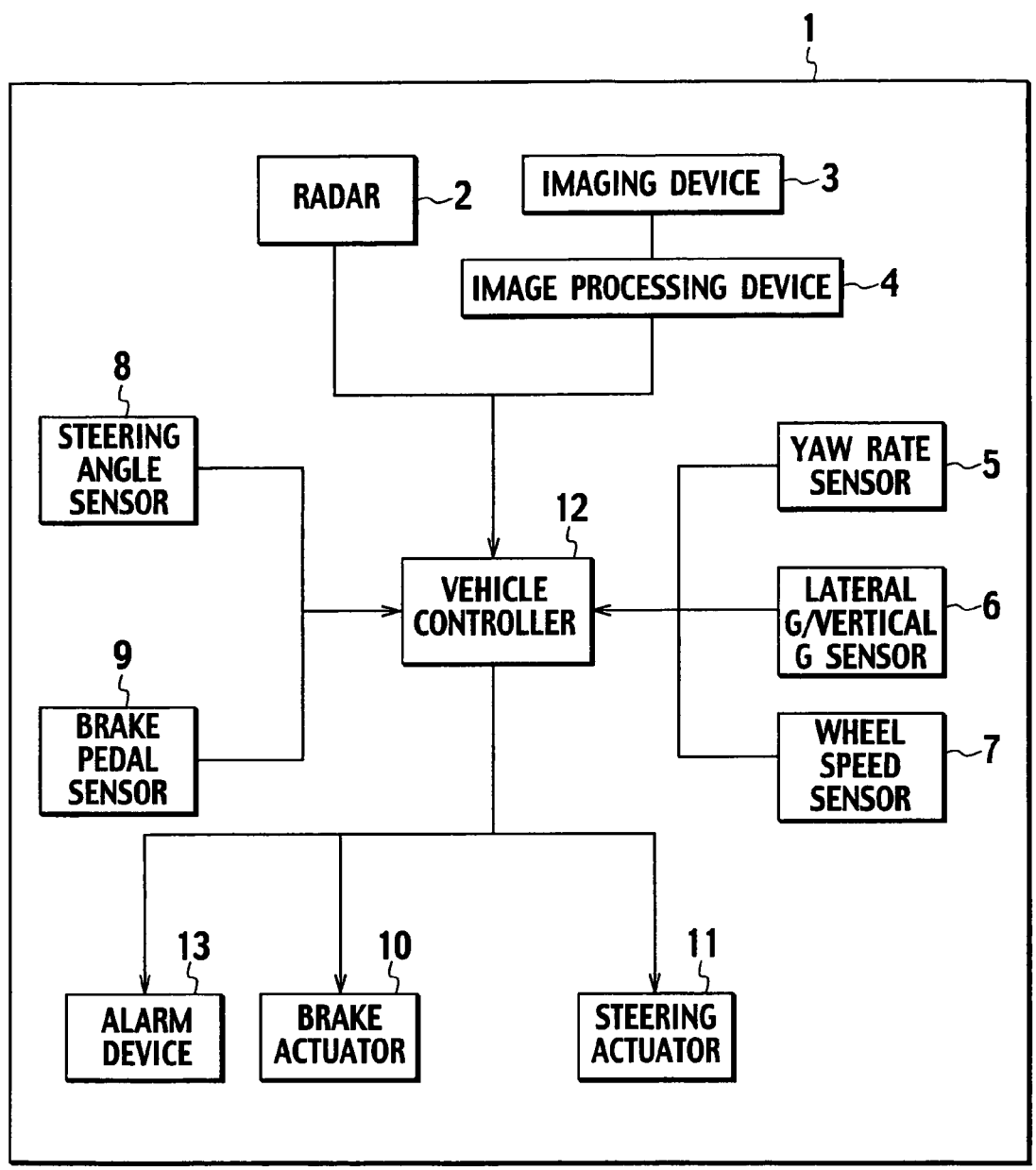
FIG. 6 is a block diagram showing a configuration of a vehicle running control apparatus according to a second embodiment of the present invention.
Figure 7:
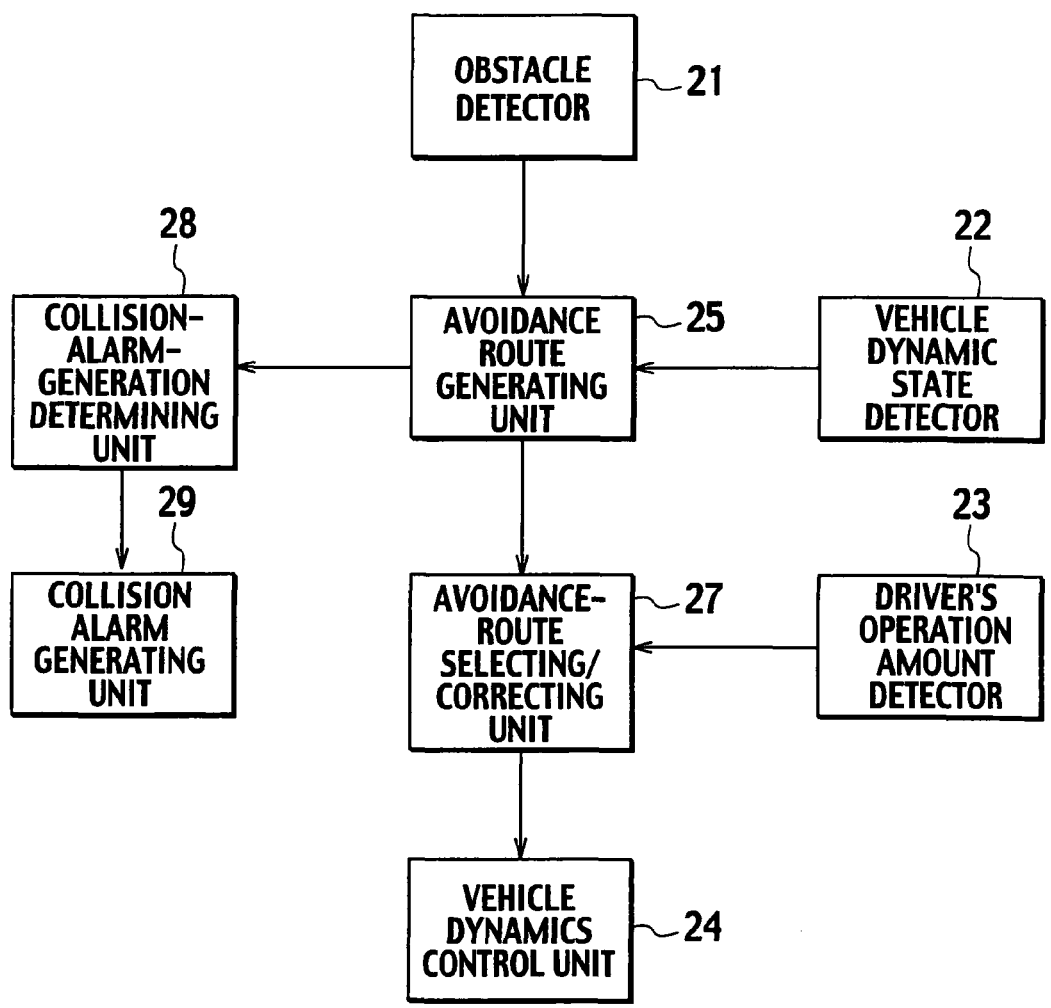
FIG. 7 is a functional block diagram of the vehicle running control apparatus shown in FIG. 6.
Figure 8:
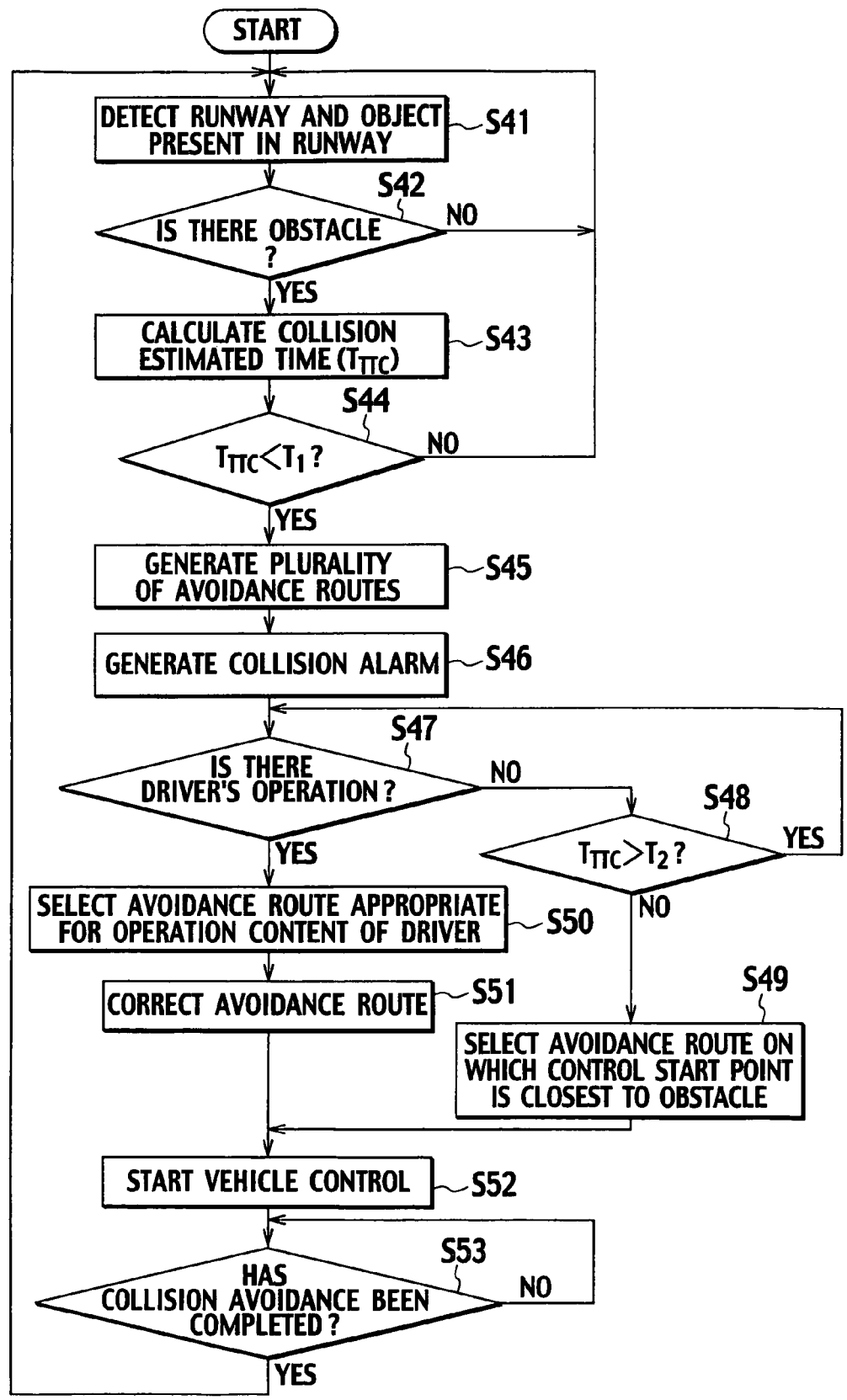
FIG. 8 is a flowchart showing a flow of a running control process according to the second embodiment.

The control apparatus according to the second embodiment additionally includes, as shown in FIG. 6, an alarm device 13 in the control apparatus of the first embodiment, and the alarm device 13 generates an alarm informing the driver of a danger of collision with the obstacle under control of the vehicle controller 12. In the control apparatus, the vehicle controller 12 functions as an avoidance route generating unit 25, the avoidance-route selecting/correcting unit 27, and a collision-alarm-generation determining unit 28, and the alarm device 13 functions as a collision alarm generating unit 29 according to the present invention shown in FIG. 7.

[Vehicle Control Process]

In the control apparatus having such a configuration, the vehicle controller 12 executes the running control process described below to avoid collision of the vehicle 1 with the obstacle. An operation of the vehicle controller 12 at the time of executing the running control process is explained with reference to a flowchart shown in FIG. 8. The process from steps S41 to S45 is the same as that from steps S1 to S5 in the flowchart shown in FIG. 3, and therefore explanations thereof will be omitted and only processes from step S46 onward are explained.

In the process at step S46, the vehicle controller 12 determines whether it is a timing to generate the alarm informing the driver of a danger of collision with the obstacle. When determining that it is the timing for generating the alarm, the vehicle controller 12 controls the alarm device 13 to generate the alarm. In the second embodiment, the determination process whether it is the timing for generating the alarm is performed according to whether the vehicle 1 has reached a point where the vehicle 1 has advanced toward the obstacle from the control start point farthest from the obstacle, among the control start points on the collision avoidance routes generated by the process at step S45, by a brake reaction distance of the vehicle 1 for a period since the driver has heard the alarm until the driver reacts thereto. When the vehicle has reached the point, the alarm is generated. Consequently, the process at step S46 is complete, and the vehicle control process proceeds to step S47.

In the process at step S47, the vehicle controller 12 refers to the input information from the steering angle sensor 8 and the brake pedal sensor 9 to determine whether at least one of the steering operation and the braking operation by the driver has been detected. As a result of determination, when both the steering operation and the braking operation have not been detected, the vehicle controller 12 advances the running control process to step S48. Because the process at steps S48 and S49 is the same as that at steps S8 and S9 in the flowchart shown in FIG. 3, explanations thereof will be omitted. On the other hand, when at least one of the steering operation and the braking operation has been detected, the vehicle controller 12 advances the running control process to step S50.

In the process at step S50, the vehicle controller 12 selects the collision avoidance route appropriate for the operation content of the driver detected by the process at step S47, from the plurality of collision avoidance routes generated by the process at step S45. Because the process at step S50 is the same as that at step S7 in the flowchart shown in FIG. 3, explanations thereof will be omitted. Consequently, the process at step S50 is complete, and the vehicle control process proceeds to step S51.

Figure 9:
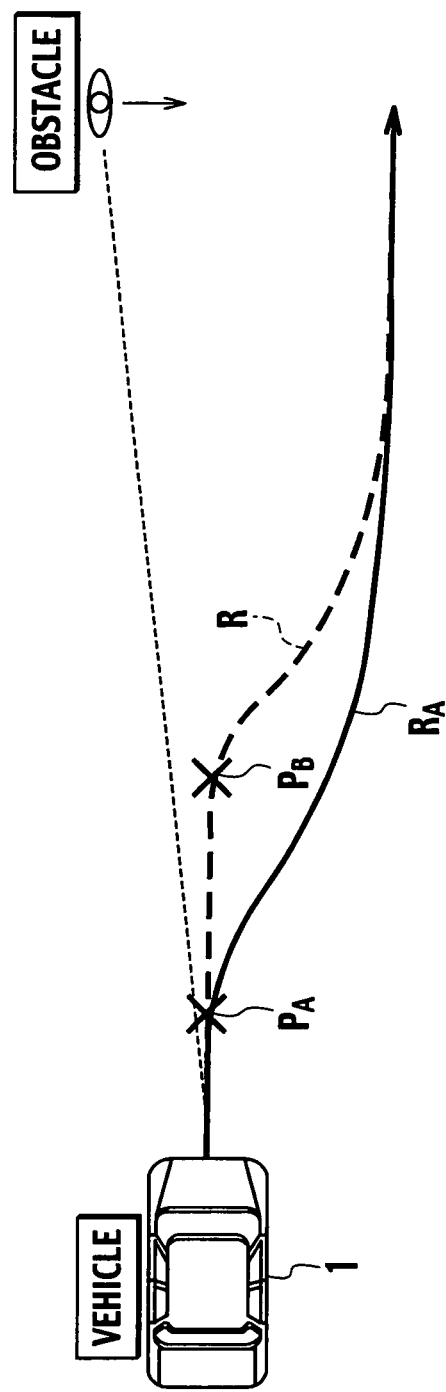
FIG. 9 shows one example of a collision avoidance route generated in the running control process shown in FIG. 8.

In the process at step S51, the vehicle controller 12 corrects the collision avoidance route selected at step S50 according to the timing at which the driver has performed the operation. Specifically, as shown in FIG. 9, when the driver has started the vehicle operation before the vehicle 1 reaches a control start point $P_B$ on the selected collision avoidance route R, the vehicle controller 12 starts the collision avoidance control from a point $P_A$ at which the driver has started the operation, so that a running route $R_A$ of the vehicle 1 due to the driver's vehicle operation overlaps on the collision avoidance route R. Accordingly, the process at step S51 is complete, and the vehicle control process proceeds to step S52.

In the process at step S52, the vehicle controller 12 controls the brake actuator 10 and the steering actuator 11 so that the vehicle 1 runs along the collision avoidance route selected by the process at step S49 or the collision avoidance route corrected by the process at step S51. Consequently, the process at step S52 is complete, and the vehicle control process proceeds to step S53.

In the process at step S53, the vehicle controller 12 determines whether the possibility of the collision between the vehicle 1 and the obstacle has disappeared due to the vehicle control or the driver's vehicle operation. As a result of determination, if there is still the possibility of collision, the vehicle controller 12 maintains the current control state, and returns the vehicle control process to step S41 at the timing at which there is no possibility of collision, to execute the vehicle control process with respect to other obstacles.

As is obvious from the above explanations, according to the vehicle control process according to the second embodiment, when the driver's vehicle operation has been detected before the vehicle 1 reaches the collision-avoidance-control start point on the selected collision avoidance route, the vehicle controller 12 corrects the selected collision avoidance route so that the collision avoidance control is started from the point at which the driver's vehicle operation has been detected. Accordingly, even if the driver starts the collision avoidance operation voluntarily, the collision avoidance control can be added without giving discomfort to the driver.

Further, in the vehicle control process according to the second embodiment, the vehicle controller 12 determines whether the vehicle 1 has reached a point where the vehicle 1 has advanced toward the obstacle by the brake reaction distance of the vehicle 1 for the period since the driver has heard the alarm until the driver reacts thereto, from the collision-avoidance-control start point farthest from the obstacle, among the collision-avoidance-control start points on the collision avoidance routes. When the vehicle has reached the point, the vehicle controller 12 generates the alarm by controlling the alarm device 13, thereby enabling to give the driver collision alarm at an appropriate timing.

Description has been made of the embodiments to which the invention created by the inventors of the present invention is applied. However, the present invention is not limited to the descriptions and the drawings, which form a part of the disclosure of the present invention according to these embodiments. Specifically, all of other embodiments, examples, operational techniques and the like, which are made by those skilled in the art based on these embodiments, are naturally incorporated in the scope of the present invention. The above is additionally described at the end of this specification.

The entire content of Japanese Patent Application No. TOKUGAN 2007-126568 with a filing date of May 11, 2007, and Japanese Patent Application No. TOKUGAN 2008-23763 with a filing date of Feb. 4, 2008, is hereby incorporated by reference.

What is claimed is:

1. A vehicle running control method comprising:
   detecting, using an obstacle detector, an obstacle in front of a vehicle;
   detecting, using a vehicle dynamic state detector, a dynamic state of the vehicle;
   generating, using an avoidance route generating unit, a plurality of collision avoidance routes for avoiding a collision of the vehicle with the obstacle based on the dynamic state of the vehicle;
   detecting, using an operation detector, an operation of the vehicle by a driver, the operation being at least one of a braking operation, a steering operation to the right, and a steering operation to the left;
   judging, using an avoidance route selecting unit, which of the generated collision avoidance routes corresponds to the detected operation of the vehicle;
   selecting, using the avoidance route selecting unit, a collision avoidance route from the plurality of generated collision avoidance routes, based at least on a result of the judging; and
   performing, using a vehicle dynamics control unit, a running control of the vehicle based on the selected collision avoidance route.

2. The vehicle running control method according to claim 1, wherein:
   the plurality of collision avoidance routes includes at least two types of collision avoidance routes, the at least two types of collision avoidance routes including:
      a collision avoidance route for avoiding the collision with the obstacle by a steering operation to the right, and
      a collision avoidance route for avoiding the collision with the obstacle by a steering operation to the left.

3. The vehicle running control method according to claim 2, wherein:
   in the step of selecting, when the steering operation to the right by the driver has been detected, a collision avoidance route for avoiding the collision with the obstacle by the steering operation to the right is selected, and
   in the step of selecting, when the steering operation to the left by the driver has been detected, a collision avoidance route for avoiding the collision with the obstacle by the steering operation to the left is selected.

4. The vehicle running control method according to claim 1, wherein:
   the step of detecting the operation of the vehicle includes detecting an operation amount, and
   when the operation amount is insufficient for the selected collision avoidance route, running control of the vehicle is performed so that the selected collision avoidance route is achieved, and
   when the operation amount exceeds the selected collision avoidance route, the running control is suppressed.

5. The vehicle running control method according to claim 1, wherein:
   the plurality of collision avoidance routes includes at least three types of collision avoidance routes, the at least three types of collision avoidance routes including:
      a collision avoidance route for avoiding the collision with the obstacle by a steering operation to the right,
      a collision avoidance route for avoiding the collision with the obstacle by a steering operation to the left, and
      a collision avoidance route for avoiding the collision with the obstacle by a braking operation, and
   in the selecting step, when the braking operation by the driver has been detected, the collision avoidance route for avoiding the collision with the obstacle by the braking operation is selected.

6. The vehicle running control method according to claim 1, wherein:
   in the step of detecting the operation of the vehicle, an operation amount is detected,
   in the step of selecting the collision avoidance route, it is determined whether a running route of the vehicle by the driver's operation overlaps on the selected collision avoidance route, and
   the step of performing running control of the vehicle is further based on a result of the determination of whether the running route of the vehicle by the driver's operation overlaps on the selected collision avoidance route.

7. The vehicle running control method according to claim 1, wherein:
in the process of detecting the operation of the vehicle, an operation amount is detected,
in the process of selecting the collision avoidance route, it is determined whether a point where the driver's operation is detected is closer to the obstacle than a starting point of the selected collision avoidance route, and
the step of performing running control of the vehicle is further based on a result of the determination of whether the point where the driver's operation is detected is closer to the obstacle than the starting point of the selected collision avoidance route.

8. The vehicle running control method according to claim 1, further comprising correcting the selected collision avoidance route such that when the operation of the vehicle by the driver has been detected before the vehicle reaches a starting point of the selected collision avoidance route, the collision avoidance control is started from a point where the operation of the vehicle by the driver has been detected.

9. The vehicle running control method according to claim 1, further comprising:
determining whether the vehicle has reached a point where the vehicle has advanced toward the obstacle by a predetermined distance from a starting point of a collision avoidance route that has a starting point farthest from the obstacle, and
generating an alarm when the vehicle has reached the point where the vehicle has advanced toward the obstacle by the predetermined distance.

10. A vehicle running control apparatus comprising:
an obstacle detector configured to detect an obstacle in front of a vehicle;
a vehicle dynamic state detector configured to detect a dynamic state of the vehicle;
an avoidance route generating unit configured to generate a plurality of collision avoidance routes for avoiding a collision of the vehicle with the obstacle by referring to the dynamic state of the vehicle detected by the vehicle dynamic state detector;
an operation detector configured to detect an operation of the vehicle by a driver, the operation being at least one of a braking operation, a steering operation to the right, and a steering operation to the left;
an avoidance route selecting unit configured to:
judge which of the generated collision avoidance routes corresponds to the detected operation of the vehicle; and
select a collision avoidance route from the plurality of generated collision avoidance routes, based at least on a result of the judgment; and
a vehicle dynamics control unit that performs running control of the vehicle based on the collision avoidance route selected by the avoidance route selecting unit.

11. The vehicle running control apparatus according to claim 10, wherein:
the plurality of collision avoidance routes includes at least two types of collision avoidance routes, the at least two types of collision avoidance routes including:
a collision avoidance route for avoiding the collision with the obstacle by a steering operation to the right, and
a collision avoidance route for avoiding the collision with the obstacle by a steering operation to the left.

12. The vehicle running control apparatus according to claim 11, wherein:
the avoidance route selecting unit is configured to select a collision avoidance route for avoiding the collision with the obstacle by the steering operation to the right, when the steering operation to the right by the driver has been detected, and
the avoidance route selecting unit is configured to select a collision avoidance route for avoiding the collision with the obstacle by the steering operation to the left, when the steering operation to the left by the driver has been detected.

13. The vehicle running control apparatus according to claim 10, wherein:
the operation detector is configured to detect an operation amount, and
the vehicle dynamics control unit is configured such that:
when the operation amount is insufficient for the selected collision avoidance route, the vehicle dynamics control unit performs running control of the vehicle so that the selected collision avoidance route is achieved, and
when the operation amount exceeds the selected collision avoidance route, the running control is suppressed.

14. The vehicle running control apparatus according to claim 10, wherein
the plurality of collision avoidance routes includes at least three types of collision avoidance routes, the at least three types of collision avoidance routes including:
a collision avoidance route for avoiding the collision with the obstacle by a steering operation to the right,
a collision avoidance route for avoiding the collision with the obstacle by a steering operation to the left, and
a collision avoidance route for avoiding the collision with the obstacle by a braking operation, and
when the braking operation by the driver has been detected, the avoidance route selecting unit selects the collision avoidance route for avoiding the collision with the obstacle by the braking operation.

15. The vehicle running control apparatus according to claim 10, wherein:
the operation detector is configured to detect an operation amount,
the avoidance route selecting unit is configured to determine whether a running route of the vehicle by the driver's operation overlaps on the selected collision avoidance route, and
the vehicle dynamics control unit is configured to perform the running control of the vehicle further based on a result of the determination of whether the running route of the vehicle by the driver's operation overlaps on the selected collision avoidance route.

16. The vehicle running control apparatus according to claim 10, wherein:
the operation detector is configured to detect an operation amount,
the avoidance route selecting unit is configured to determine whether a point where the driver's operation is detected is closer to the obstacle than a starting point of the selected collision avoidance route, and
the vehicle dynamics control unit is configured to perform the running control of the vehicle further based on a result of the determination of whether the point where the driver's operation is detected is closer to the obstacle than the starting point of the selected collision avoidance route.

17. The vehicle running control apparatus according to claim 10, further comprising a correcting unit configured to correct the selected collision avoidance route such that when the operation of the vehicle by the driver has been detected before the vehicle reaches a starting point of the selected collision avoidance route, the collision avoidance control is started from a point where the operation of the vehicle by the driver has been detected.

18. The vehicle running control apparatus according to claim 10, further comprising an alarm unit configured to:
determine whether the vehicle has reached a point where the vehicle has advanced toward the obstacle by a predetermined distance from a starting point of a collision avoidance route that has a starting point farthest from the obstacle, and
generate an alarm when the vehicle has reached the point where the vehicle has advanced toward the obstacle by the predetermined distance.

19. A vehicle running control method comprising:
detecting, using an obstacle detector, an obstacle in front of a vehicle;
detecting, using a vehicle dynamic state detector, a dynamic state of the vehicle;
generating, using an avoidance route generating unit, a plurality of collision avoidance routes for avoiding a collision of the vehicle with the obstacle based on the dynamic state of the vehicle;
detecting, using an operation detector, an operation of the vehicle by a driver;
when at least one of the collision avoidance routes corresponds to the detected operation of the vehicle, selecting, using an avoidance route selecting unit, a collision avoidance route corresponding to the detected operation of the vehicle, from the plurality of generated collision avoidance routes;
when none of the plurality of generated collision avoidance routes corresponds to the detected operation of the vehicle by the driver, selecting, using the avoidance route selecting unit, a collision avoidance route whose starting point is closest to the obstacle as seen from a point where the driver's operation is detected;
performing, using a vehicle dynamics control unit, a running control of the vehicle based on the selected collision avoidance route.

20. A vehicle running control apparatus comprising:
an obstacle detector configured to detect an obstacle in front of a vehicle;
a vehicle dynamic state detector configured to detect a dynamic state of the vehicle;
an avoidance route generating unit configured to generate a plurality of collision avoidance routes for avoiding a collision of the vehicle with the obstacle by referring to the dynamic state of the vehicle detected by the vehicle dynamic state detector;
an operation detector configured to detect an operation of the vehicle by a driver;
an avoidance route selecting unit configured such that:
when at least one of the collision avoidance routes corresponds to the detected operation of the vehicle, the avoidance route selecting unit selects a collision avoidance route corresponding to the detected operation of the vehicle, from the plurality of generated collision avoidance routes, and
when none of the plurality of generated collision avoidance routes corresponds to the detected operation of the vehicle by the driver, the avoidance route selecting unit selects a collision avoidance route whose starting point is closest to the obstacle as seen from a point where the driver's operation is detected, from the plurality of generated collision avoidance routes; and
a vehicle dynamics control unit that performs running control of the vehicle based on the collision avoidance route selected by the avoidance route selecting unit.

21. The vehicle running control method according to claim 1, wherein:
in the process of selecting the collision avoidance route, when a point where the driver's operation is detected is closer to the obstacle than a starting point of the collision avoidance route corresponding to the detected operation of the vehicle and a running route of the vehicle does not overlap on the collision avoidance route, another collision avoidance route is selected whose starting point is closest to the point where the driver's operation is detected.

22. The vehicle running control apparatus according to claim 10, wherein:
when a point where the driver's operation is detected is closer to the obstacle than a starting point of the collision avoidance route corresponding to the detected operation of the vehicle and a running route of the vehicle does not overlap on the collision avoidance route, the avoidance route selecting unit is configured to select another collision avoidance route whose starting point is closest to the point where the driver's operation is detected.

* * * * *